United States Patent
Isaccsson et al.

(10) Patent No.: US 6,673,469 B2
(45) Date of Patent: Jan. 6, 2004

(54) ARRANGEMENT FOR DECREASING GALVANIC CORROSION BETWEEN METAL COMPONENTS

(75) Inventors: Malte Isaccsson, Sävedalen (SE); Henrik Hyttel, Sydals (DK); Thomas Hermansson, Västra Frölunda (SE); Stig Andersen, Augustenborg (DK); Kalsten Andersen, Wilanow (PL); Mikael Fransson, Västra Frölunda (SE)

(73) Assignee: Volvo Personvagnar AB, Göteborg (SE)

(*) Notice: Subject to any disclaimer, the term of this patent is extended or adjusted under 35 U.S.C. 154(b) by 0 days.

(21) Appl. No.: 09/683,441

(22) Filed: Dec. 28, 2001

(65) Prior Publication Data

US 2002/0086178 A1 Jul. 4, 2002

Related U.S. Application Data

(63) Continuation of application No. PCT/SE00/01397, filed on Jun. 30, 2000.

(30) Foreign Application Priority Data

Jun. 30, 1999 (SE) .............................................. 9902504

(51) Int. Cl.[7] .............................. B32B 15/01; F16B 1/00; C23C 30/00
(52) U.S. Cl. ....................... 428/642; 428/649; 428/650; 428/659; 428/617; 411/902
(58) Field of Search ..................... 428/648, 659, 428/642, 649, 617, 650; 411/902

(56) References Cited

U.S. PATENT DOCUMENTS

| | | | | |
|---|---|---|---|---|
| 3,772,179 A | | 11/1973 | Beer | |
| 4,188,459 A | * | 2/1980 | Hyner et al. | ................ 205/176 |
| 4,904,352 A | * | 2/1990 | Witte | .......................... 205/148 |
| 4,980,195 A | * | 12/1990 | Olds | .......................... 427/367 |
| 5,143,743 A | * | 9/1992 | Wilde et al. | ................. 420/513 |
| 5,260,100 A | * | 11/1993 | Day | ............................ 427/386 |
| 5,275,892 A | * | 1/1994 | Hyner et al. | ................. 205/176 |
| 5,493,815 A | * | 2/1996 | Belser et al. | .................. 49/377 |
| 5,782,194 A | * | 7/1998 | Tipton | ..................... 114/79 W |
| 6,308,544 B1 | * | 10/2001 | Kuehnl et al. | ............... 205/154 |
| 6,325,138 B1 | * | 12/2001 | Garosshen et al. | ......... 165/133 |

FOREIGN PATENT DOCUMENTS

| | | |
|---|---|---|
| DE | 1669299 A | 12/1970 |
| EP | 0251080 A2 | 1/1988 |
| EP | 0895875 A1 | 2/1999 |
| JP | 56149780 A | 11/1981 |
| JP | 9144725 A | 6/1997 |
| WO | WO 9817841 A1 | 4/1998 |

* cited by examiner

Primary Examiner—John J. Zimmerman
Assistant Examiner—Jason L. Savage
(74) Attorney, Agent, or Firm—Fitch, Even, Tabin & Flannery

(57) ABSTRACT

Arrangement (1) for decreasing galvanic corrosion between metal components that includes at least a first component (2) in which a first metal is a part, and at least a second component (3) in which a second metal is a part, whereby the first metal has a higher normal-electrode potential ($e^0$) than the second metal. The first component (2) is intended, after mounting, to be in electrical contact with the second component (3). The first component (2) is coated with a substantially continuous surface layer (4) that is adjusted to give the second component (3) an insignificant galvanic corrosion velocity after mounting. The invention is preferably applied in association with attachment elements such as bolt or screw joint reinforcements, which include a more noble metal than the component or the components with which the attachment element should be in contact with after mounting, and is particularly, preferred for vehicle components.

18 Claims, 1 Drawing Sheet

US 6,673,469 B2

ARRANGEMENT FOR DECREASING GALVANIC CORROSION BETWEEN METAL COMPONENTS

CROSS REFERENCE TO RELATED APPLICATIONS

The present application is a continuation of International Application No. PCT/SE00/01397, filed Jun. 30, 2000, which claims priority to Swedish Application No. 9902504-1, filed Jun. 30, 1999. Both applications are expressly incorporated herein by reference.

BACKGROUND OF INVENTION

1. Technical Field

The present intention relates to an arrangement for decreasing galvanic corrosion between metal components. The term metal components is intended to encompass both components comprising pure metals and components comprising metal alloys. The invention is preferably applied in association with a fixing element, such as a screw or bolt connection, which includes a more noble metal than the metal component or the metal components as the fixing element should be in electrical contact with upon mounting. The invention is particularly advantageous when applied at vehicle components, but may also be used for metal components in other applications where a risk for galvanic corrosion exists.

2. Background of the Invention

Chemical attacks of, among other things, oxygen from the air, on a metal, is often referred to as atmospheric corrosion. Gold and platinum are examples of metals that are most resistant to (noble) atmospheric corrosion, while other metals such as aluminum, chrome and stainless steel alloys are normally become covered by a protective layer in air that prevents further attack. On the other hand, the corrosion products associated with iron do not give such a corrosion protecting oxide layer.

In the case that two different metals are brought in electrical contact with each other in a humid environment, a so-called galvanic corrosion may occur. The effects of so-called galvanic corrosion may be studied for instance by launching a motorboat with a propeller shaft of stainless steel and a propeller of bronze in salt water. In this instance, galvanic corrosion leads to considerable attacks on the lesser noble propeller after only a short time. Consequently, in the case of motorboats, it is customary to attach a so-called sacrifice anode of an even lesser noble metal than those present in the propeller under the water line, which leads to the result that the sacrifice anode corrodes instead of the propeller. Thus, the sacrifice anode gives the propeller a protection against galvanic corrosion until the anode has been consumed and must be replaced by another.

The galvanic corrosion may be explained through a discussion of electrochemical activity. Metals can be divided in a so-called electrolytic electromotive chain. If pieces of two different metals, being in different positions in the electromotive chain, are located in an electrolyte and are in electrical contact with each other, a galvanic element appears. Thereby, the metal at the lowest position in the electromotive chain becomes an anode or solution pole, while the second metal becomes a cathode or precipitant pole.

The location of the metals in the electromotive chain may be stated as so-called normal-electrode potentials at 25° C. whereby, for instance, iron (Fe) is often stated to have the value of −0.440 volts and magnesium (Mg) a value of −2.37 volts. In the case that pieces of magnesium and iron are brought into electrical contact with each other in an electrolyte, a short-circuited galvanic element is obtained, where the magnesium functions as an anode/solution pole and dissolves during formation of ions and delivering electrons. At the iron-piece functioning as cathode/precipitant pole, hydrogen gas (H2) will instead be precipitated out of the electrolyte, or oxygen gas will be reduced.

It should be noted that the humidity that is in air which is normally present contains sufficient dissolved elements to function as an electrolyte. Therefore, galvanic corrosion may appear without the actual metals being immersed in any liquid.

There are a number of methods to protect metals that are susceptible to corrosion against atmospheric corrosion. Amongst such methods, a coating may be applied, for instance, using different anti-corrosive agents, galvanization, and chromium plating etcetera.

Regarding protection against atmospheric corrosion and/ or galvanic corrosion, it is also known to use particular sacrifice coatings such as a corrodible first metal that is coated with an even more corrodible second metal with the ability to form a protecting oxide layer. Thus, it is previously known, to coat a metal substrate by means of steam dumping with a sacrificial coating of aluminum to protect the substrate from corrosive attacks.

Further, it is previously known that different cathode surfaces have different kinetic properties regarding disintegrating water and reducing hydrogen ions and oxygen gas.

Further a method is described in U.S. Pat. No. 4,980,195 to prevent atmospheric corrosion of steel, in which the steel substrate, which should be protected, is coated with aluminum by means of ionic steam dumping coating. The steel coated with aluminum is then immersed in an aqueous acid solution of an indium acid salt, which is said to give small surface deposits of metallic indium. These surface deposits are stated to be able to activate "the sacrificial properties" of the aluminum of the coating so that the coating provides a better corrosive protection than a pure aluminum coating.

Further, U.S. Pat. No. 4,844,943 describes a process to protect a metallic surface against corrosion depending on the contact with the vanadium and/or sodium oxides at gas combustion temperatures coming up as a consequence of combustion of heavy fuels. The process is stated to include the deposition of a layer of at least one protecting metal chosen from the group containing alkaline earth metals, boron, aluminum, gallium, indium, thallium, silicon, zirconium and titanium on the metal surface. The protective metal is stated to oxidize in situ to form a protective oxide layer reacting with vanadium oxide, sodium oxides or solutions thereof, to form a composition with a softening temperature being higher than the softening temperature of vanadium or sodium oxides.

The International Patent Application No. PCT/DK95/00421 of one of the applicants describes a coated aluminum material containing a substrate of aluminum or aluminum alloy at least with a surface section thereof, and a first layer containing oxides of the substrate material, and a second layer substantially containing indium, tin and/or gallium. The coated aluminum material is particularly useful in cars, aircrafts and buildings, and has very good properties with regard to corrosion resistance, abrasion resistance and low friction.

Among others with purpose to be able to decrease fuel consumption by means of a lower vehicle weight, the use of different lightweight materials has increased even more in the vehicle manufacturing industry. This has lead to an increased use of materials such as aluminum, magnesium and alloys of these metals. For different reasons it is still necessary and/or desirable to be able to use more traditional materials such as steel alloys for certain vehicle components. The increased amounts of different metals and metal alloys, which are used in modern engine vehicles, have lead to an increased risk that galvanic corrosion should appear between different components.

The risk for galvanic corrosion may often be particularly great in association with attachment means or elements, fasten articles or consoles, since, for instance, bolts and screws for reasons of strength often contain a steel alloy, while the components which should be joined together often contain light weight materials. Further, the use of attachment means is often particularly great in positions, for instance of engine vehicles, where a high air humidity provides good prerequisites for galvanic corrosion, such as in association with wheel suspensions of the engine vehicle or inside the engine bay.

In order to reduce the problems of galvanic corrosion of attachment means, for instance for use in engine vehicles, an intermediate aluminum plate is often mounted between, for instance, a bolt or a screw of steel at the attachment means, and a component of a light weight metal or light weight metal alloy. This is particularly common in the case of magnesium alloys.

Even if the solution of such an electrochemical plate is more compatible and it reduces the problem of galvanic corrosion between the attachment means and the actual metal component, it gives an undesirable added weight, an undesirable added cost, a more complicated mounting, and in some cases a greater risk for settlements in the joint.

SUMMARY OF INVENTION

One purpose of the present invention is to provide an arrangement for decreasing galvanic corrosion between metal components, removing the need for corrosion decreasing plates or spacers, and thus, admits both cost and weight savings, and forms more simple mountings and more stable joints.

This purpose is achieved by way of an arrangement that includes a first component in which a first metal is a part thereof, and a second component in which a second metal is a part thereof. The first metal has a higher normal-electrode potential $e^0$ than the second metal and the first component is intended, after mounting, to be in electrical contact with the second component. In one aspect of the invention, the first component is coated with a substantially continuous surface layer that is adjusted to provide the second component with an insignificant galvanic corrosion velocity after the mounting.

A second purpose of the present invention is to provide an arrangement for decreasing the galvanic corrosion between metal components which may be accomplished with a proportionally low environmental influence regarding both work environment and surrounding ecosystems. In at least one embodiment, this second purpose is accomplished by a surface layer of the arrangement that substantially consists of indium (In), an indium alloy or an indium compound.

Further purposes of the present invention will be apparent from the following description, as will the features that enable these additional purposes to be achieved.

BRIEF DESCRIPTION OF DRAWINGS

The invention will, in the following, be described in greater detail with reference to the enclosed drawing, in which.

DETAILED DESCRIPTION

Figure 1:
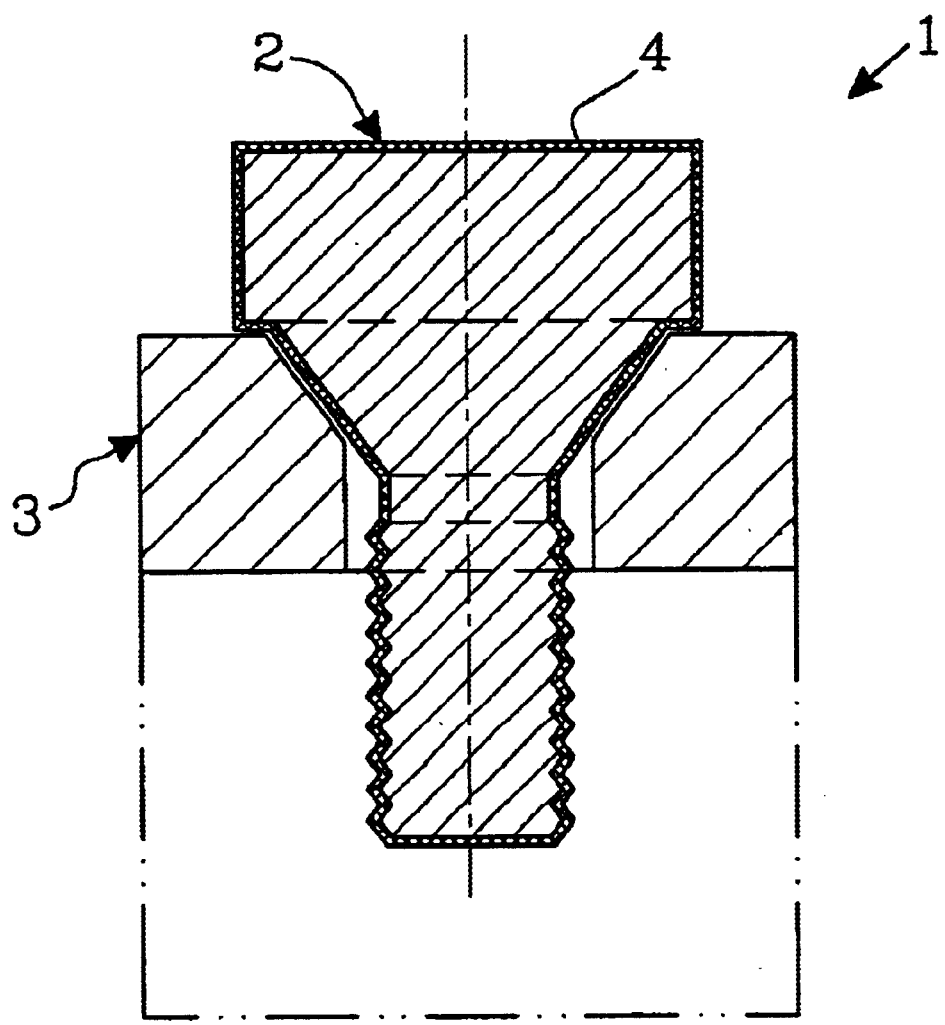
FIG. 1 shows a schematic cross-sectional view of a preferred embodiment of an arrangement configured according to the teachings of the presently disclosed invention(s).

In the following, a number of different embodiments of an arrangement configured and used according to the invention (s) will be described, and where applicable, with reference to the illustration of FIG. 1.

The arrangement 1 is intended for decreasing the galvanic corrosion between metal components and includes at least a first component 2 in which a first metal is a part thereof, and at least a second component 3 in which a second metal is a part thereof. It should be understood that other metals or metal alloys may also be part of the respective components.

The first metal has a higher normal-electrode potential $e^0$ than the second metal. In this respect, with normal-electrode potential is herein intended to have been obtained in measurements using a normal hydrogen gas electrode at 25° C., in the way as it is stated for instance in the text by G. Hagg, entitled "Allm ä n och oorganisk kemi"(eng. "General and inorganic chemistry"), Stockholm, 1963. According to this publication, for instance, $e^0$ of the redox reaction of magnesium (Mg) is stated to be −2.37 volts, while $e^0$ of the redox reaction of iron (Fe) is stated to be −0.44 volts.

In arrangements configured according to the present invention, the first component 2 is intended to be in electrical contact with the second component 3 after mounting.

Further and in accordance with the invention, the first component 2 is coated with a substantially continuous surface layer 4 that is adapted to give the second component 3 an insignificant galvanic corrosion velocity after the mounting. It is of great importance that the surface layer 4 be substantially continuous for the intended effect to be obtained. The term "insignificant corrosion velocity" herein means that the second component galvanically corrodes with a velocity that is insignificant in proportion to the commonly expected lifetime of the component.

According to a preferred embodiment, the insignificant corrosion velocity, expressed as a current density $I_O$ at a cathode reaction under formation of hydrogen gas in a 1 M strong acid, is less than $10^{-12}$ A/cm². The term $I_O$ herein means the current density as is stated, for instance, at page 236 in "Instrumental Methods in Electrochemistry," Ellis Hirwood Limited, 1990, Chicester, England. By this very slow kinetic corrosion velocity, the surface layer 4, i.e. the cathode, reassures that the galvanic corrosion attacks on the second component 3; i.e., the anode, only remains insignificant during a long period of time with regard to practical purposes.

In another embodiment, the surface layer 4 is adapted to form, at increasing pH due to the corrosion, a hydroxide with a solubility that gives a lower content of free hydroxide ions than $10^{-5}$ M in distilled water at 25° C. In this embodiment, the substantially insoluble hydroxide formed in the surface layer will make it difficult for the underlying metal layer to form a solution as a side reaction due to alkalization.

In a particularly preferred embodiment the surface layer 4 comprises indium (In) or an indium compound.

Because of environmental reasons, the surface layer 4 mainly consists of indium, an indium alloy or an indium compound. In comparison with other corrosion inhibitors, indium is namely considered to be proportionally harmless, both from the point of view of labor welfare and when it comes to contaminations to the external environment, since indium has not been shown to have any obviously negative environmental consequences.

Further, in another preferred embodiment, the surface layer 4 includes a sealer such as alkali silicate/silicate of sodium. In this embodiment, it is reassured that possible pores of the surface layer 4 are sealed, and that an electrically insulating layer is formed.

According to still a further embodiment, the surface layer 4 includes an addition of tin, zinc, bismuth or gallium. This embodiment makes it possible to create the properties of the surface layer based on the requirements of the actual application.

The surface layer 4 of the first component 2 is preferably coated by means of hot dipping process, electrolysis, steam dumping coating, mechanical coating or chemical coating; mechanical or chemical plating may for instance be used. It is also possible to use other appropriate coating processes familiar to those skilled in these arts.

In one preferred embodiment, the surface layer 4 has a thickness in the range of 0.5–100 $\mu$m. However, the thickness must be adapted to the actual application depending on the actual porosity of the surface layer, expected mechanical abrasion, required length of life, and other relevant characteristics.

In another preferred embodiment, the second component 3 is principally composed of a metal alloy of magnesium (Mg) or aluminum (Al). As should be well-known to those persons skilled in the art, such metal alloys may under certain conditions be sensitive to galvanic corrosion; and thus, an arrangement, configured according to the invention, will be particularly suited for intended uses in this embodiment.

In a particularly preferred embodiment of the arrangement according to the invention, the second metal is magnesium (Mg). It is well-known that magnesium may show great problems with galvanic corrosion, whereby the increased use of magnesium, for instance in the vehicle manufacturing industry, makes this embodiment particularly preferred.

In another preferred embodiment of the arrangement, the first component 2 is principally composed of an untreated or surface finished steel alloy.

In a further preferred embodiment of the arrangement, the first component 2 is coated with zinc or tin-plated below the surface layer 4.

In one embodiment of the invention, the first component 2 is an attachment element such as a bolt or a screw. In this embodiment the corrosive protecting properties of the arrangement, according to the invention, will be particularly useful, since the attachment element is often located in particularly corrosion exposed positions for instance of a motor vehicle, and nevertheless must be able to be remounted even after a long time after the original mounting, something which may easily be impossible with previously known attachment elements.

In yet another embodiment, the first component is a fixed item or a console (not shown in the figures), which are usually frequent components, for instance, of the vehicle industry and is often exposed for galvanic corrosion.

In a particularly preferred embodiment of the arrangement according to the invention, the first and the second component of vehicle components are intended to be used for instance in a passenger car or a truck.

The preferred invention should not be seen as limited to what has been described above in association to the preferred embodiments, or to what is shown in the enclosed drawings, but the scope of the invention is defined by the following patent claims.

What is claimed is:

1. An arrangement for decreasing galvanic corrosion between metal components, said arrangement comprising at least a first component in which a first metal is a part, and at least a second component in which a second metal is a part, whereby the first metal has a higher normal-electrode potential (e°) than the second metal, and whereby the first component is intended after mounting to be in electrical contact with the second component, the first component is coated with a surface layer substantially continuous separating said first metal and said second metal, said substantially continuous surface layer being adjusted to give the second component an insignificant galvanic corrosion velocity after mounting, and said surface layer comprising a material selected form the group consisting of indium, and indium compound, or an indium alloy, and said second metal comprising a metal selected from a group consisting of magnesium, a metal alloy of magnesium or a metal alloy of aluminum.

2. An arrangement according to claim 1, wherein the insignificant corrosion velocity, expressed as a current density $I_O$ at a cathode reaction under formation of hydrogen gas in a 1 M strong acid, is less than $10^{-12}$ A/cm$^2$.

3. An arrangement according to claim 1, wherein the surface layer comprises an indium.

4. An arrangement according to claim 1, wherein the surface layer comprises an indium compound.

5. An arrangement according to claim 1, wherein the surface layer consists mainly of indium, an indium alloy or an indium compound.

6. An arrangement according to claim 1, wherein the surface layer further comprises a sealer.

7. An arrangement according to claim 1, wherein the surface layer further comprises an additional element chosen from the group including tin, zinc, bismuth and gallium.

8. An arrangement according to claim 1, wherein the surface layer has been coated onto the first component by means chosen from the group consisting of hot dipping, electrolysis, steam dumping coating, mechanical coating and chemical coating.

9. An arrangement according to claim 1, wherein the surface layer has a thickness in the range of 0.5 to 100 $\mu$m.

10. An arrangement according to claim 1, wherein the second component is substantially composed of a metal alloy of magnesium.

11. An arrangement according to claim 1, wherein the second component is substantially composed of a metal alloy of aluminum.

12. An arrangement according to claim 1, wherein the second metal is magnesium.

13. An arrangement according to claim 1, wherein the first component is substantially composed of an untreated or surface finished steel alloy.

14. An arrangement according to claim 1, wherein the first component is coated with zinc underneath the surface layer.

15. An arrangement according to claim 1, wherein the first component is tin-plated underneath the surface layer.

16. An arrangement according to claim 1, wherein the first component is an attachment element chosen from the group consisting of bolts and screws.

17. An arrangement according to claim 1, wherein the first component is a console.

18. An arrangement according to claim 1, wherein the first and the second component are vehicle components.

* * * * *

UNITED STATES PATENT AND TRADEMARK OFFICE
CERTIFICATE OF CORRECTION

PATENT NO. : 6,673,469 B2
DATED : January 6, 2004
INVENTOR(S) : Malte Isacsson et al.

It is certified that error appears in the above-identified patent and that said Letters Patent is hereby corrected as shown below:

Title Page,
Item [75], Inventors, change "Kalsten" to -- Karsten --.

Column 6,
Line 12, change "continuous" to -- continuously --.
Line 17, change "form" to -- from --.

Signed and Sealed this

First Day of June, 2004

JON W. DUDAS
*Acting Director of the United States Patent and Trademark Office*